(12) United States Patent
Lembersky et al.

(10) Patent No.: US 11,978,442 B2
(45) Date of Patent: May 7, 2024

(54) IDENTIFICATION AND CLASSIFICATION OF TALK-OVER SEGMENTS DURING VOICE COMMUNICATIONS USING MACHINE LEARNING MODELS

(71) Applicant: NICE LTD, Ra'anana (IL)

(72) Inventors: Gennadi Lembersky, Ra'anana (IL); Neta Rosenfeld, Ra'anana (IL)

(73) Assignee: NICE LTD., Ra'anana (IL)

( * ) Notice: Subject to any disclaimer, the term of this patent is extended or adjusted under 35 U.S.C. 154(b) by 378 days.

(21) Appl. No.: 17/570,121

(22) Filed: Jan. 6, 2022

(65) Prior Publication Data

US 2023/0215429 A1    Jul. 6, 2023

(51) Int. Cl.
| | | |
|---|---|---|
| *G10L 15/00* | (2013.01) | |
| *G10L 15/02* | (2006.01) | |
| *G10L 15/04* | (2013.01) | |
| *G10L 15/20* | (2006.01) | |
| *G10L 15/22* | (2006.01) | |
| *G10L 25/78* | (2013.01) | |
| *H04M 3/51* | (2006.01) | |

(52) U.S. Cl.
CPC .............. *G10L 15/20* (2013.01); *G10L 15/02* (2013.01); *G10L 15/04* (2013.01); *G10L 15/22* (2013.01); *G10L 25/78* (2013.01); *H04M 3/5175* (2013.01)

(58) Field of Classification Search
CPC ......... G10L 15/00; G10L 15/07; G10L 15/10; G10L 15/20; G10L 15/22; G10L 15/26; G10L 15/30; G10L 15/02; G10L 15/063; G10L 15/08; G10L 15/1822; G10L 15/183; G10L 15/19; G10L 15/193; G10L 21/0208; G10L 25/78; G10L 25/87; G10L 19/00; G10L 19/005; G10L 15/16; G10L 25/27; G10L 25/30
See application file for complete search history.

*Primary Examiner* — Vu B Hang
(74) *Attorney, Agent, or Firm* — Haynes and Boone, LLP

(57) ABSTRACT

A system and methods are provided to analyze audio signals from an incoming voice call. The system includes a processor and a computer readable medium operably coupled thereto, to perform voice analysis operations which include receiving a first audio signal comprising a first audio waveform of a first speech between at least two users during the incoming voice call, accessing speech segment parameters for analyzing the audio signals, determining one or more talk-over segments in the first audio waveform using the speech segment parameters, extracting audio features from each of the one or more talk-over segments, determining, using a machine learning (ML) model trained for interruption analysis of the audio signals, whether each of the one or more talk-over segments are a negative interruption or a non-negative interruption based on the audio features, and determining whether to output a first notification for the negative interruption or the non-negative interruption.

20 Claims, 7 Drawing Sheets

IDENTIFICATION AND CLASSIFICATION OF TALK-OVER SEGMENTS DURING VOICE COMMUNICATIONS USING MACHINE LEARNING MODELS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates generally to voice data processing and speech identification, and more specifically to a system and method for improved speech classification for talk-over segments between two or more users during voice communications using machine learning (ML) models for interruption identification and analysis.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized (or be conventional or well-known) in the prior art. The subject matter in the background section merely represents different approaches, which in and of themselves may also be inventions.

When customers interact with different computing systems of a service provider, such as sales or purchasing systems, customer relationship management (CRM) systems, service or help systems, information systems, and the like, the customers may engage with live agents via voice communications including phone calls, video conferences, and the like. These customers may correspond to individual users and/or users of an organization that may want to utilize CRM systems to gain access to certain services and/or data, for example, computing services that the users have enrolled in and/or purchased, data the user has stored or generated, and/or previous activity the user has performed with the service provider's systems. During voice communications, such as communications over a publicly switched telephone network (PSTN), cellular network, voice over IP (VoIP), voice over LTE (VoLTE), and/or voice communications over data networks, live agents may engage with customers to provide assistance and services. When engaging in these services, users and agents may speak with each other in a conversation to request and provide services, as well as engage in other communications.

However, during voice conversations and communications, there may be times where both the user/customer and live agent talk at the same time, also known as crosstalk or talk-over segments and occurrences. Talk-over time may be one of metrics used to measure the quality of service provided by an agent in a contact center. This talk-over occurs when an agent and customer speak at the same time and may be a good indicator of a sentiment of the customer during the voice communications. Ideally, talk-over may be important to identify in real-time, as conventional sentiment models may rely on an ending of a call (e.g., the last 20% of the call) and do not accurately portray sentiment occurring earlier during the call. However, talk-overs are not always bad. Talk-overs may be neutral (e.g., asking the user or agent to repeat the last sentence, if there is external interference, etc.) or even supportive of the conversation (e.g., by stating "ok," "I understand," or "I agree" in response so other conversation). By not identifying 'good' versus 'bad' talk-over segments, systems may not adequately assess agents' performance. Further, CRM systems and platforms may not accurately convey useful data to agents during voice communications. It therefore is desirable to differentiate between 'good' and 'bad' talk-over segments and/or interruptions in an intelligent manner to provide more efficient, real-time, and accurate CRM data and services during voice communications.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion. In the figures, elements having the same designations have the same or similar functions.

DETAILED DESCRIPTION OF PREFERRED EMBODIMENTS

Figure 1:
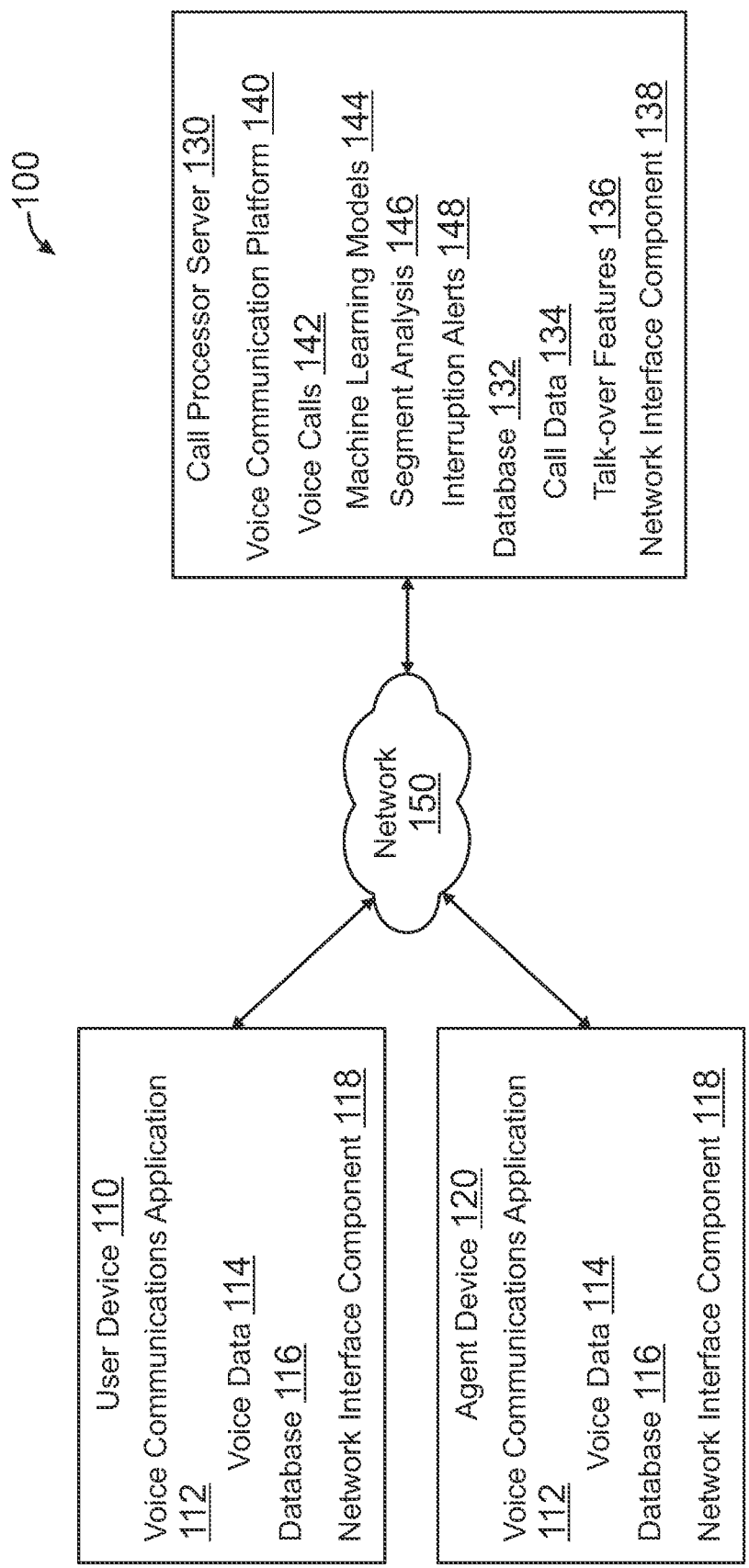
FIG. 1 is a simplified block diagram of a networked environment suitable for implementing the processes described herein according to an embodiment.

This description and the accompanying drawings that illustrate aspects, embodiments, implementations, or applications should not be taken as limiting—the claims define the protected invention. Various mechanical, compositional, structural, electrical, and operational changes may be made without departing from the scope of this description and the claims. In some instances, well-known circuits, structures, or techniques have not been shown or described in detail as these are known to one of ordinary skill in the art.

In this description, specific details are set forth describing some embodiments consistent with the present disclosure. Numerous specific details are set forth in order to provide a thorough understanding of the embodiments. It will be apparent, however, to one of ordinary skill in the art that some embodiments may be practiced without some or all of these specific details. The specific embodiments disclosed herein are meant to be illustrative but not limiting. One of ordinary skill in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Overview

An artificial intelligence (AI), machine learning (ML), or neural network (NN) system trained for talk-over segment classification, methods, data structures, and systems are provided to train and utilize an AI model to classify talk-over segments detected during voice communications. These may be categorized into "good," "neutral," and/or "bad" talk-over and interruptions to provide faster, such as in real-time or near real-time, recommendations and alerts to agents involved in customer service an assistance. A service provider, such as a sale and purchasing system, help or assistance system, CRM system, customer service system, business management system, organizational management system, or other networked service provider, may provide audio and/or audiovisual communications. This may include phone calls, video conferencing, audio/video streaming and communication services, and the like. For example, different internal and/or external users of a service provider may interact over end-to-end voice communications. During voice communications, users, such as customers of a service provider or other business entity, may engage in conversation with agents or other users, employees, and/or assistance personnel of the entity. The user and the agent may speak, however, may engage in speech at the same time. Each user may have a corresponding audio or voice communication channel and may provide acoustic signals that are detected, recorded, buffered, and/or processed by the service provider. However, in conventional systems, users may merely engage in conversation, but no analytics are typically provided of the conversation and/or if the agents are engaging in poor CRM practices, such as by interrupting and/or speaking over the customer. Further, analytics in conventional systems are merely provided after the fact based on peer review. Thus, there may be significantly time delays to providing helpful notifications and alerts to agents that may conventionally assist in providing CRM services.

To properly categorize talk-over or crosstalk segments that may be associated with interruptions, a voice analysis system described herein may utilize an AI model and system, such as an ML, NN, or Deep NN (DNN) model and system, to classify talk-over segments into different types of interruptions. As discussed herein, talk-over segments, crosstalk, and/or interruptions may be utilized interchangeably to describe portions of audio from a conversation of two or more users having two or more audio channels where voice activity and acoustic signals are detected at the same time, thereby denoting that two or more speakers were speaking at the same time. Initially, a service provider, or other voice analysis system that utilizes voice analysis and processing, may train an AI system having one or more AI models, such as ML, NN, or DNN models, for classification of talk-over segments and notification when talk-over segments are bad or indicate poor customer service. The training data may initially correspond to voice data channels and acoustic signals taken of voice communications, where talk-over segments and interruptions may be identified. The training data may include features from the talk-over segments, which may be extracted and processed, and training data features may then be used as an input to train one or more ML nodes, layers, and classifications. The training data may be annotated, such as by assigning a marker of zero if the talk-over segment is bad, one if the talk-over segment is good, or other identifier that may label the training data, preferably in a quantifiable numerical manner. The AI model may be trained using an ML and/or deep learning algorithm or technique to determine the individual layers and output classifications.

The AI model may be used for classifications. Since an ML, NN, or DNN model may normally output a similarity score, ranking, and/or classification, the hidden layers may be trained to provide one or more categorizations at an output layer. For example, the input may be a stereo voice conversation between an agent and a customer/user, and voice activity detection (VAD) or speech activity detection (SAD) may be used to extract features from one or more waveforms of the stereo voice conversations of the agent and/or user. This may be used to detect the presence or absence of human speech during the conversation, and therefore identify when speech starts and ends from each user during the conversation. In some embodiments, automatic speech recognition (ASR) may also be used to transfer or transcribe a segment of speech into words to determine whether the words indicate interruptions, and to facilitate categorizing bad talk-over segments or agreements and affirmatives that may be good talk-over segments. However, ASR is not required, and the AI models discussed herein may be language agnostic to detect and categorize talk-over segments without regard to individual words, syntax, and/or semantics of the speech.

Once the categorizations are determined and an AI model is trained, the AI model may be deployed with a CRM system for customer services provided to users. This may include voice analysis during voice communications between agents for a service provider and customers or other end users utilizing the services provided by the service provider. A voice analysis system may then receive voice communications of users and agents during provision of a service for the CRM system. The voice communications may have one or more voice data channels, such as individual voice communications from each user involved in the conversation. The voice analysis system may then identify speech segments and may compare the channels, the speech segments, and timestamps or start/end times of each speech segment to determine any talk-over segments and/or interruptions.

Thus, the voice analysis system may determine a channel identifier (ID), a start offset, and/or an end offset for analysis by the AI model and system. The voice analysis system may extract additional features for the AI model and system, which may include an interruption duration, a threshold associated with whether the speaker started to talk simultaneously after a silence, who is interrupting, a simultaneous start of speech by other users, a beginning offset, an interrupter offset, a speaker switch, and the like. Using these features, the voice analysis system may provide input to the AI system, which may provide a predictive output on whether the talk-over and/or interruption is bad and leads to poor customer satisfaction and assistance, or whether the interruption is neutral and good, which may be permissible and/or encouraged during the voice communications. When one or more bad interruptions occur by an agent of the CRM system with a user, the voice analysis system may provide a notification or alert to the agent to minimize future bad interruptions.

The embodiments described herein provide methods, computer program products, and computer database systems for intelligent talk-over segment categorization during voice communications. The service provider system associated with or incorporating the voice categorization AI system may therefore categorize and/or encode talk-over segments during voice communications for improved CRM systems and notifications for enhanced user interactions. For example, the online system may provide a voice analysis AI system that provides faster and more precise notification of problematic voice communications, thereby resulting in better CRM systems.

According to some embodiments, in a service provider computing system accessible by a plurality of separate and distinct organizations, a voice analysis AI model is provided for identifying, predicting, and designating particular voice data into distinct categorizations, thereby optimizing voice communications in CRM systems, reducing after-the-fact data processing and analytics, and providing faster notifications with better accuracy during voice communications.

Example Environment

The system and methods of the present disclosure can include, incorporate, or operate in conjunction with or in the environment of a voice analysis service, system, database, and portal, which may include web and device applications used for voice authentication. FIG. 1 is a block diagram of a networked environment suitable for implementing the processes described herein according to an embodiment. As shown, an environment 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or another suitable device and/or server-based OS. It can be appreciated that the devices and/or servers illustrated in FIG. 1 may be deployed in other ways and that the operations performed, and/or the services provided, by such devices and/or servers may be combined or separated for a given embodiment and may be performed by a greater number or fewer number of devices and/or servers. For example, cloud-based architectures have been developed to improve collaboration, integration, and community-based cooperation between users without sacrificing data security. One or more devices and/or servers may be operated and/or maintained by the same or different entities.

FIG. 1 illustrates a block diagram of an example environment 100 according to some embodiments. Environment 100 may include a user device 110, an agent device 120, and a call processor server 130 that interact to provide automated detection of talk-over segments during voice communications using ML models and other AI systems. In other embodiments, environment 100 may not have all of the components listed and/or may have other elements instead of, or in addition to, those listed above. In some embodiments, the environment 100 is an environment in which categorization of talk-over segments is provided. User device 110 may be any machine or system that is used by a user to perform voice communications with an agent device 120. User device 110 and/or agent device 120 can be a handheld computing device, a mobile phone, a laptop computer, a notepad computer, a workstation, a network of computing devices, or any other devices capable of voice communications. As illustrated in FIG. 1, user device 110 and/or agent device 120 might interact via a network 150 with each other and call processor server 130, which analyzes voice communications for talk-over segments.

User device 110 may be utilized in order to access computing services, resources, and/or data via a voice communication application 112. User device 110 may be utilized by a customer, client, or another user that interacts with agent device 120 and call processor server 130 during voice communications. A user's unique ID may be provided during voice communications. The user may initially call agent device 120 and/or call processor server 130 during use of a CRM system or the like. The user may provide voice data 114 using voice communication application 112, where agent device 120 may respond to user device 110 via voice data 124 using voice communications application 122. Thus, user device 110 and agent device 120 may each correspond to a device, server, or the like that interfaces with call processor server 130 to utilize the services, applications, data storage, and the like of the corresponding computing environment. Call processor server 130 may receive the unique ID for the customer and provide access to computing resources via voice communication platform 140. Thereafter, voice communication application 112 residing locally on user device 110 may utilize voice communication platform 140 provided by call processor server 130.

Call processor server 130 may be utilized by different customers, clients, organizations, companies, and/or other users to access and utilize computing resources, which may be provided through voice communications. Call processor server 130 may provide computing services via voice communication platform 140 and may process voice calls 142 using machine learning (ML) models 144. Voice communication platform 140 may include applications utilized by users, which provide services, data processing, storage, and the like to user device 110, such as those involved in sale and purchasing, help or assistance, CRM, business management, organizational management, and the like. ML models 144 may be used to perform segment analysis 146, which may include determining if talk-over segments are good, bad, neutral, or the like (e.g., a 5-point scale from strongly good to strongly bad). In this regard, segment analysis may then provide interruption alerts 148 where talk-over segments may be categorized as bad and/or causing an interruption that leads to poor customer service as identified by ML models 144. Voice communication platform 140 may also include other applications associated with user interface display, data processing or output, data retrieval and/or storage, user interface display and output, server security, and other additional applications for cloud and/or on-premises computing architectures.

Call processor server 130 may provide services for voice calls 142 through voice communication platform 140. For example, voice data 114 and voice data 124 may be provided during voice calls 142. Voice communication platform 140 may process the different channels of audio data provided by each of voice data 114 and voice data 124 using VAD, SAD, and optionally ASR. ML models 144 may then be used to classify any interruptions, talk-over segments, and the like to provide segment analysis 146. Interruption alerts 148 may be used to output one or more alerts, such as to the agent using agent device 120 where the talk-over segments may be categorized as bad or leading to poor customer service and satisfaction. Voice communication platform 140 may therefore be used by call processor server 130 to interact with agent device 120 during voice communications to provide predictive analysis and outputs during voice calls 142.

In some embodiments, the users of user device 110 and agent device 120 may differ in their respective capacities, and the capacity of a particular user might be determined by applications, permissions, and profiles for the current user. Thus, different users will have different capabilities and perform different authentication events with regard to communicating via voice communications applications 112 and 122. However, this is not mandatory, and it is understood that user device 110 and/or agent device 120 may generally have certain capacities that are universal to users, entities, or other clients (thereby not specific to operations submitted for processing by call processor server 130).

User device 110 may execute a web-based client that accesses a web-based application for call processor server 130, or may utilize a rich client, such as a dedicated resident application, to access call processor server 130. User device 110 may utilize one or more application programming interfaces (APIs) to access and interface with call processor server 130 to engage in voice calls 142 with agent device 120. Thus, voice communication application 112 can be used to access data and applications hosted by call processor server 130, for example, through providing a user interface to a user (e.g., a GUI output) or via an API of voice communication application 112. Interfacing with call processor server 130 may be provided through voice communication application 112 and may include data stored by database 116, such as a device fingerprint, device ID, or other ID that may be provided during a login and authentication event via voice authentication process 114. Similarly, agent device 120 may engage with call processor server 130 via voice communication application 122 and may provide data stored by database 126. Call processor server 130 may process and provide data through voice communication platform 140, such as classification of talk-over segments during voice communications between user device 110 and agent device 120. Database 132 of call processor server 130 may store data associated with call data 134 including talk-over features 136, which may be utilized with the trained AI, ML, or NN models of ML models 144.

User device 110 and agent device 120 might communicate with call processor server 130 using TCP/IP and, at a higher network level, use other common Internet protocols to communicate, such as hypertext transfer protocol (HTTP or HTTPS for secure versions of HTTP), file transfer protocol (FTP), wireless application protocol (WAP), etc. Communication between user device 110, agent device 120, and call processor server 130 may occur over network 150 using a network interface component 118 of user device 110, a network interface component 128 of agent device 120, and/or a network interface component 138 of call processor server 130. In an example where HTTP/HTTPS is used, user device 110 and agent device 120 might include an HTTP/HTTPS client commonly referred to as a "browser" for sending and receiving HTTP//HTTPS messages to and from an HTTP//HTTPS server, such as call processor server 130 via network interface component 118 and network interface component 128. Similarly, call processor server 130 may host an online platform accessible over network 150 that communicates information to and receives information from user device 110 and/or agent device 128 via network interface component 138. Such an HTTP/HTTPS server might be implemented as the sole network interface between user device 110, agent device 120, and call processor server 130, but other techniques might be used as well or instead. In some implementations, the interface between user device 110, agent device 120, and call processor server 130 includes load sharing functionality. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

User device 110 may utilize network 150 to communicate with call processor server 130, which is any network or combination of networks of devices that communicate with one another. For example, the network can be any one or any combination of a local area network (LAN), wide area network (WAN), telephone network, wireless network, point-to-point network, star network, token ring network, hub network, or other appropriate configuration. As the most common type of computer network in current use is a transfer control protocol and Internet protocol (TCP/IP) network, such as the global inter network of networks often referred to as the Internet. However, it should be understood that the networks that the present embodiments might use are not so limited, although TCP/IP is a frequently implemented protocol.

According to one embodiment, call processor server 130 is configured to provide webpages, forms, applications, data, and media content to user device 110 and agent device 120 and/or to receive data from user device 110 and agent device 120. In some embodiments, call processor server 130 may be provided or implemented in a server environment and/or cloud environment, which may be accessible through one or more APIs with or without a corresponding graphical user interface (GUI) output. Call processor server 130 further provides security mechanisms to keep data secure. Additionally, the term "server" is meant to include a computer system, including processing hardware and process space(s), and an associated storage system and database application (e.g., object-oriented data base management system (OODBMS) or relational database management system (RDBMS)). It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

Several elements in the system shown in FIG. 1 include embodiments that are explained briefly here. For example, user device 110 and agent device 120 could include a desktop personal computer, workstation, laptop, notepad computer, PDA, cell phone, or any wireless access protocol (WAP) enabled device or any other computing device capable of interfacing directly or indirectly to the Internet or other network connection. User device 110 and agent device 120 may also be a server or other online processing entity that provides functionalities and processing to other client devices or programs, such as online processing entities that provide services to a plurality of disparate clients.

User device 110 and agent device 120 typically runs an HTTP/HTTPS client, e.g., a browsing program, such as Microsoft Internet Explorer® or Edge browser, Google Chrome® browser, Mozilla Firefox® browser, or a WAP-enabled browser in the case of a cell phone, notepad computer, PDA or other wireless device, or the like. According to one embodiment, user device 110 and agent device 120 and all of their components are configurable using applications, such as a browser, including computer code run using a central processing unit such as an Intel Pentium® processor or the like. However, user device 110 and/or agent device 120 may instead correspond to a server configured to communicate with one or more client programs or devices, similar to a server corresponding to call processor server 130 that provides one or more APIs for interaction with user device 110 and agent device 120.

Thus, user device 110, agent device 120, and/or call processor server 130 and all of their components might be operator configurable using application(s) including computer code to run using a central processing unit, which may include an Intel Pentium® processor or the like, and/or multiple processor units. A server for user device 110, agent device 120, and/or call processor server 130 may correspond to Window®, Linux®, and the like operating system server that provides resources accessible from the server and may communicate with one or more separate user or client devices over a network. Exemplary types of servers may provide resources and handling for business applications and the like. In some embodiments, the server may also correspond to a cloud computing architecture where resources are spread over a large group of real and/or virtual systems. A computer program product embodiment includes a machine-readable storage medium (media) having instructions stored thereon/in which can be used to program a computer to perform any of the processes of the embodiments described herein utilizing one or more computing devices or servers.

Computer code for operating and configuring user device 110, agent device 120, and/or call processor server 130 to intercommunicate and to process webpages, applications and other data and media content as described herein are preferably downloaded and stored on a hard disk, but the entire program code, or portions thereof, may also be stored in any other volatile or non-volatile memory medium or device corresponding to database 116, database 126, and/or database 132, such as a read only memory (ROM) or random-access memory (RAM), or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory integrated circuits (ICs)), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, virtual private network (VPN), LAN, etc.) using any communication medium and protocols (e.g., TCP/IP, HTTP, HTTPS, Ethernet, etc.) as are well known. It will also be appreciated that computer code for implementing embodiments of the present disclosure can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun MicroSystems, Inc.).

Artificial Intelligence Model for Talk-Over Segment Categorization

Figure 2:
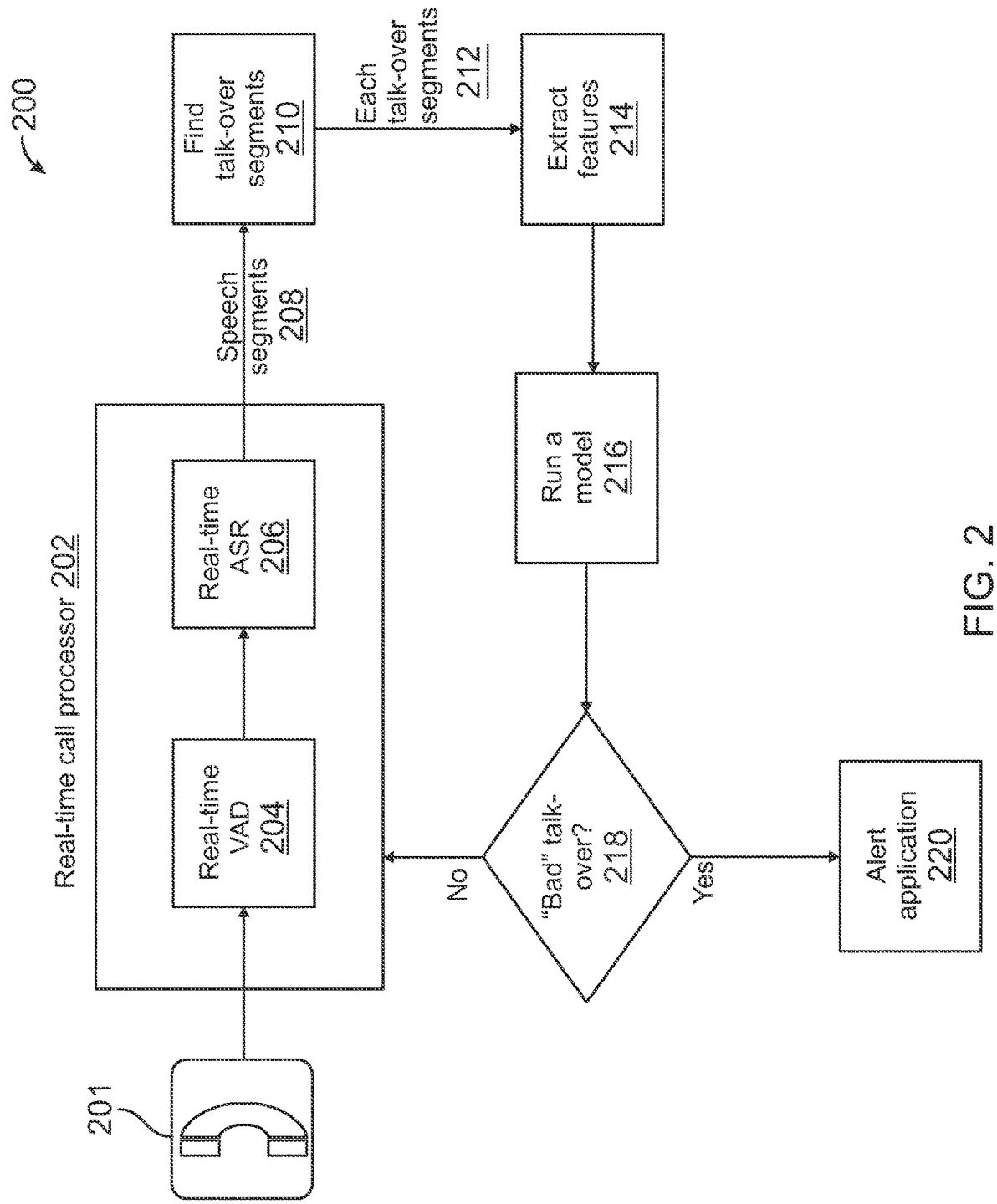
FIG. 2 is a simplified diagram of an exemplary process for executing a machine learning model and engine that categorizes talk-over segments during voice communications according to some embodiments.

FIG. 2 is a simplified diagram 200 of an exemplary process for executing a machine learning model and engine that categorizes talk-over segments during voice communications according to some embodiments. In diagram 200, a real-time call processor 202 may be provided, which may analyze voice communications for talk-over segment identification and classification. In this regard, real-time call processor 202 may be provided by call processor server 130 discussed in reference to environment 100 of FIG. 1.

In diagram 200, a call 201 is first received by real-time call processor 202, which analyzes one or more voice communication and/or audio channels for talk-over segment identification and classification. In this regard, initially a set of features for ML model training and categorization of talk-over segments are extracted and used to train one or more models, as discussed in further detail with regard to FIGS. 3 and 4. Real-time call processor 202 may then be executed in order to provide classifications of talk-over segments during an incoming call. When call 201 is received, call 201 is buffered in a database or cache in order to process the data from the different voice or audio channels. This may correspond to providing a 20-30 second buffer of the voice call, which is then refreshed and continuously buffered during the voice call.

Thereafter, real-time call processor 202 may perform real-time VAD 204 on call 201 having the incoming signals from both channels to detect voice activity. Real-time VAD 204 may detect the present or absence of human speech, which may be used on the streamed conversation to identify times (e.g., starting and ending offsets of speech) for voice activity detected from each channel. Where speech is detected, real-time VAD 204 may provide a channel identifier (e.g., first channel or channel 1, second channel or channel 2, etc.) and any times of occurrence of the voice activity. In some embodiments, real-time ASR 206 may also be performed to transform or transcribe the incoming audio and/or segment of speech into a list of words. However, real-time ASR 206 may not be necessary and instead real-time VAD 204 may be used, which may be speech and/or language independent without requiring conversion of the audio to words and analysis of the words, sentences, grammar, and the like. Where real-time ASR 206 is used, the input may be speech segments from real-time VAD 204, which may be converted to a data structure having the identification of the audio channel, the words, and a time of occurrence (e.g., start and end) to each word in the speech segments.

Speech segments 208 are then provided as input to a talk-over segment identification 210, which identifies any talk-over segments. This may be done by taking the speech segments and identifying when different channels have audio start offsets and/or end offsets that intersect or occur at the same time. This may be done by iteratively traversing the lists of audio start and end times for each channel and identifying any interactions. Intersections may include no intersections, intersections, and/or inclusions. For example, FIG. 3 displays different types of intersections that may be used to identify talk-over segments.

Figure 3:
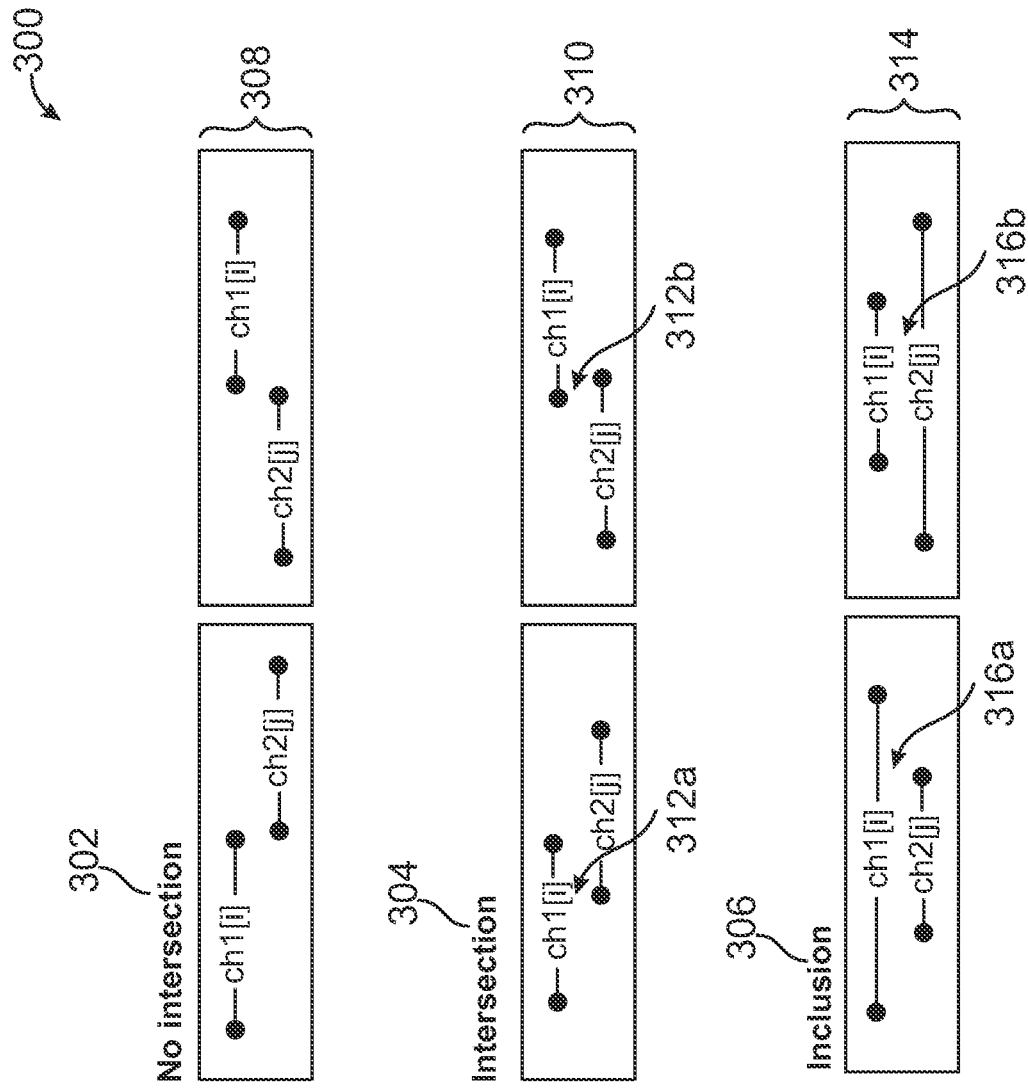
FIG. 3 is a simplified diagram of different types of talk-over segments and interruptions during voice communications according to some embodiments.

FIG. 3 is a simplified diagram 300 of different types of talk-over segments and interruptions during voice communications according to some embodiments. In diagram 300, different voice activity and/or speech is detected from two different audio channels, one corresponding to a user or customer and one corresponding to an agent or other employee of a business, CRM system, and/or organization. In this regard, each channel may be provided by user device 110 and agent device 120, as discussed in reference to environment 100 of FIG. 1.

In diagram 300, three possible cases for intersections of speech and/or voice activity during a phone call having two channels are shown. In this regard, the algorithm recognizes these three cases, which assist in identifying talk-over segments. With a no intersection interaction 302, it can be seen that speech in channel 1 ends before speech in channel 2 is detected, or vice versa. Thus, speech interactions 308 do not intersect and therefore talk-over segments are not identified. However, in an intersection interaction 304, it can be seen that a speech segment in channel 1 starts before a speech segment in channel 2 segment starts and ends before the speech segment in channel 2 ends, or vice versa. Thus, in speech interactions 310, it can be seen that there is an overlap 312a and an overlap 312b where speech occurs in both channels at the same time. This may be designated as a talk-over segment, where further analysis may be required to determine whether the talk-over segment is bad and requires an alert. Similarly, with an inclusion interaction 306, is can been seen that speech in channel 1 occurs at the same time, begins prior to speech in channel 2 and ends after speech in channel 2 ends, or vice versa. Thus, with speech interactions 314, there are included speech 316a and included speech 316b, which may occur while the speech in the other channel occurs. As such, further analysis of these included talk-over segments is required for determination of whether there are bad talk-over segments.

Returning to FIG. 2 after identification of each talk-over segment 212, a feature extraction 314 is then performed using the ML model system and engine. In this regard, a set of features from the different talk-over segments in diagram 300 of FIG. 3 are required to be processed to identify bad talk-over segments. For example, an algorithm may be executed for feature extraction 314, where features for each talk-over segment are determined. The features may be determined using VAD and/or ASR with a list of segments in a data table having a channel identifier, start offset, and/or end offset, as well as any determined words. An interruption start offset and end offset may also be used, as well as a threshold time to determine if the speakers started to speak simultaneously after a silence. For each intersection and interruption, an interruption duration, an interrupter (e.g., agent or customer), a simultaneous start, a beginning offset (e.g., time elapsed since the beginning of the call), an interrupter offset (e.g., time elapsed since the interrupters last words), and/or a speaker switch (e.g., did the speaker switch after the interruption occurred) may each be determined.

Using the features from feature extraction 214, an ML model 216 is run next to determine whether any interruptions are classified as "bad" interruptions or talk-overs, thereby leading to poor customer satisfaction. The output of ML model 216 is therefore a predictive classification or score of the talk-over segments to identify bad talk-over segments 218. ML model 216 may be trained as discussed with regard to FIG. 4. Thereafter, if no bad talk-over segments 218 are identified, diagram 200 returns to real-time call processor 202, where further call data and audio signals are buffered and processed. However, if one or more bad talk-over segments 218 are identified, an alert application 220 is then executed, which may output one or more alerts to an agent or other user during the call. These alerts in alert application 220 may be displayed via a user interface, such as the one shown in FIG. 5. In this regard, alert application 220 may provide a dialog to an agent with a predefined message, a compute having an interruption time by the agent during the call, which may be shown to the agent and/or a supervisor, and/or other similar notifications and alerts. The alert may, for example, display a suggested or mandatory corrective action, a coaching recommendation to review later, or both.

Figure 4:
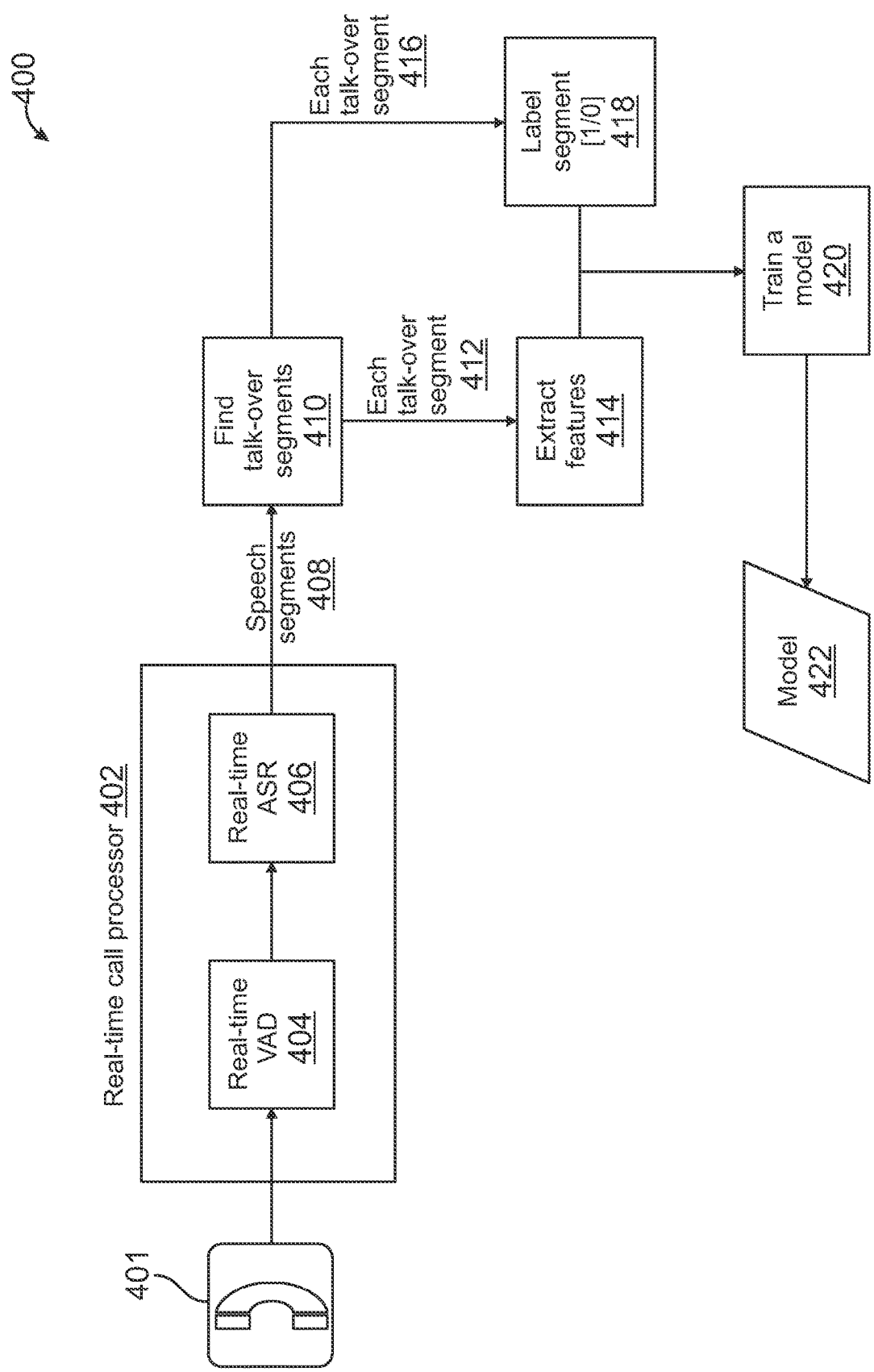
FIG. 4 is a simplified diagram of an exemplary process for training a machine learning model and engine that categorizes talk-over segments during voice communications according to some embodiments.

FIG. 4 is a simplified diagram 400 of an exemplary process for training a machine learning model and engine that categorizes talk-over segments during voice communications according to some embodiments. In diagram 400, a real-time call processor 402 may be provided, which may be used to train one or more ML models for speech segment classification into interruption or talk-over segment types (e.g., good, bad, neutral, etc.). In this regard, real-time call processor 402 may be provided by call processor server 130 discussed in reference to environment 100 of FIG. 1.

Similar to diagram 200 of FIG. 2, real-time call processor 402 may include components that may be used for speech segment analysis and identification of talk-over segments. In this regard, initially call data 401 is provided as input, which may be processed using real-time VAD and/or real-time ASR 406 in order to identify talk-over segments, which have speech occurring at the same time. Speech segments 408 from real-time call processor 402 may then be processed to identify talk-over segments 410. In order to train an ML model using the talk-over segments 410, each talk-over segment 412 is provided to feature extraction 414. Feature extraction 414 may function to identify different features of talk-over segments and interruptions, including those described in reference to diagram 200. Data and data structures for feature extraction 414 may include conversation audio files, speech segments, ASR speech segments and data, channel identifiers, a start offset, an end offset, words or sentences, interruption durations, a beginning offset, a silence threshold, a simultaneous start, an interrupter, an interrupter offset, a speaker switch, and/or a bad talk-over threshold.

Further, each talk-over segment 416 is processed for segment labeling 418. Segment labeling 418 is executed in order to provide a labeling for ML model training where interruptions are manually labeled and may be used in order for an ML model to provide classifications. Thus, segment labeling 418 may provide a zero or one label, which may be used to designate whether the interruption is good or bad. The distribution of good and bad interruptions may be about equal in order to provide balanced data for training. Thereafter, using features extracted from feature extraction 414 and the labels for segment labeling 418, model training 420 is performed. In various embodiments, model training may use linear regression, random forest, XGBoost, or another ML model algorithm and trainer. In some embodiments, random forest may be selected or another decision tree type ML model, however, other algorithms may also be selected for desired performance. Model training 420 may include model classifications, feature vectors, labels, model scores, and the like that may be used during training and/or later classifications.

An ML or NN model may include three groupings of layers—an input layer, one or more hidden layers, and an output layer having one or more nodes, however, different layers may also be utilized. The ML model may include fewer, or as many, hidden layers as necessary or appropriate. These nodes in each layer are connected to nodes in an adjacent layer. In this example, the ML model receives a set of input values and produces one or more output values, for example, in the case of talk-over segment classification to determine a particular category or classification as good or bad interruptions. The outputs may correspond to a score and/or output classification of talk-over segments and interruptions. However, different, more, or fewer outputs may also be provided based on the training. When the ML model is used, each node in the input layer may correspond to a distinct attribute or input data type derived from the training data provided by feature extraction 414 and segment labeling 418. In a non-limiting example, the input nodes may include voice data and/or features from voice data of a call, which may or may not include annotations corresponding to segment labeling 418.

In some embodiments, each of the nodes in the hidden layer generates a representation, which may include a mathematical computation (or algorithm) that produces a value based on the input values of the input nodes. The mathematical computation may include assigning different weights to each of the data values received from the input nodes. The hidden layer nodes may include different algorithms and/or different weights assigned to the input data and may therefore produce a different value based on the input values. Each node in a hidden layer may be connected to the nodes in the adjacent hidden layer such that nodes from input layer may be connected to nodes in the hidden layers, which may be connected to nodes and corresponding outputs in the output layer. The values generated by the hidden layer nodes may be used by the output layer node to produce an output value for the ML model. When the ML model is used to categorize talk-over segments, the output values produced by the ML model may indicate a likelihood that an interruption falls into a particular category of good or bad interruptions.

A model 422 may be trained by using training data from feature extraction 414 and segment labeling 418, which may also be prepared by converting data to numerical representations and vectors. By providing training data to model 422, the nodes in exemplary hidden layers may be trained (adjusted) such that an optimal output (e.g., a classification) is produced in the output layer based on the training data. By continuously providing different sets of training data and penalizing the ML model when the output of the ML model is incorrect (e.g., when the interruptions and other talk-over segments are improperly categorized), the ML model (and specifically, the representations of the nodes in the hidden layer) may be trained (adjusted) to improve its performance in data classification. Adjusting the ML model may include adjusting the weights associated with each node in the hidden layer.

Figure 5:
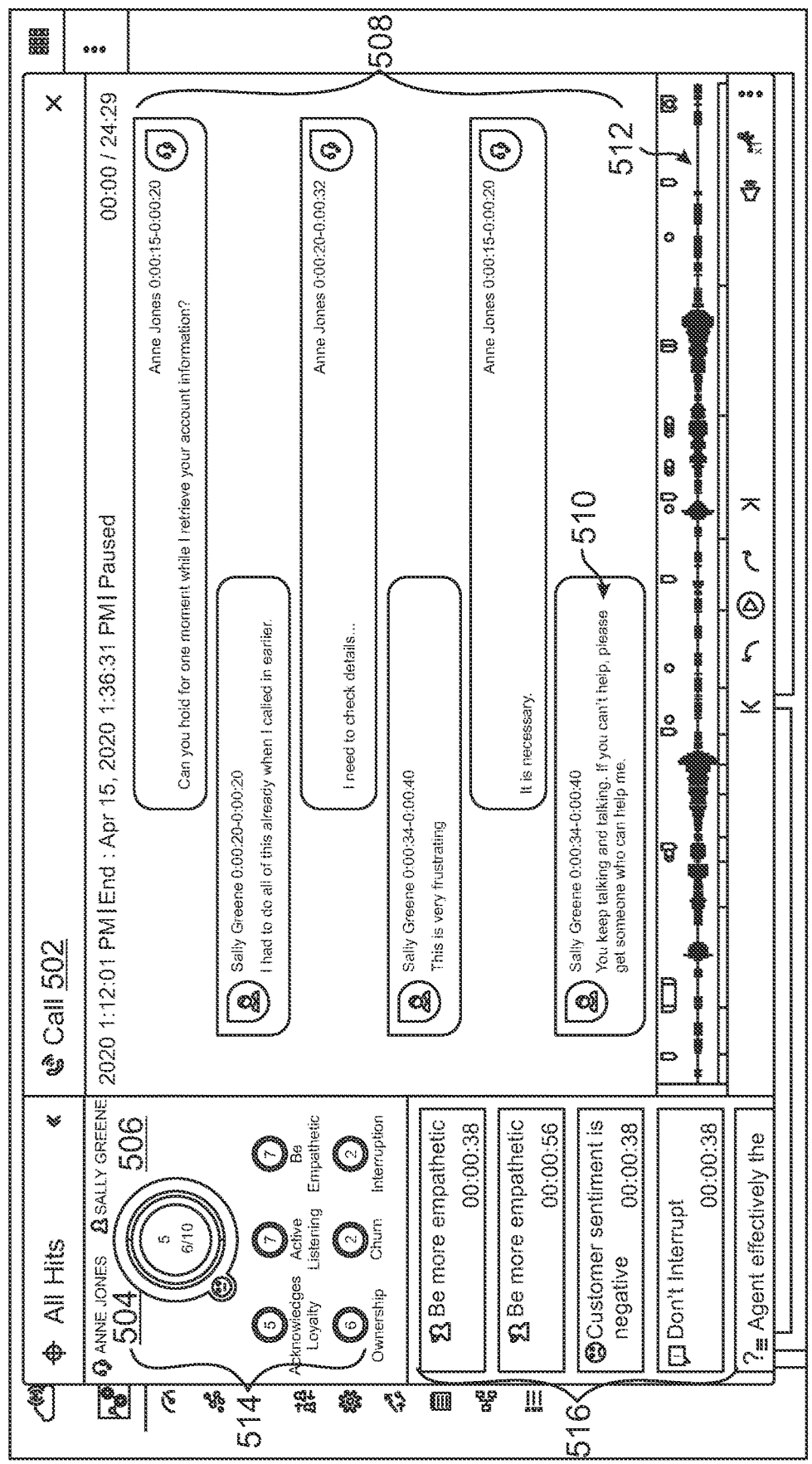
FIG. 5 is an exemplary user interface for providing notifications and alerts associated with talk-over segments and interruptions during voice communications according to some embodiments.

FIG. 5 is an exemplary user interface 500 for providing notifications and alerts associated with talk-over segments and interruptions during voice communications according to some embodiments. User interface 500 of FIG. 5 may be displayed to a user during a voice communication session with another user, such as to an agent of a CRM system or the like when engaging in voice communications with a customer.

In user interface 500, a call 502 is shown as being conducted between an agent 504 and a customer 506. Call text 508 may be displayed in user interface 500, which may result from VAD and/or ASR processing of the audio channels for call 502. Additionally, a customer request 510 is shown for a negative interaction or sentiment of customer 506, which indicates a talk-over segment or interruption was bad and customer 506 is having a negative experience with agent 504. Audio signal 512 may be shown to designate where VAD and speech occurs, as well as move through the speech during call 502 for further analysis. This may allow agent 504, as well as a supervisor or other user that may assist agent 504, with determining what led to the negative experience and/or how agent 504 may provide better customer service by avoiding negative or bad interruptions.

The voice data of call 502 may be processed using the ML model described in FIGS. 2 and 4. In this regard, an audio waveform from one or more audio channels may be processed and features may be extracted, for example, from at least audio signal 512. By using the features as input, interruptions or talk-over segments may be identified, which may then be classified and/or categorized as negative or non-negative (e.g., positive or good) interruptions and/or talk-overs. By processing this data, one or more outputs may be provided in user interface 500, which may include agent score 514 and agent notifications 516 used to provide alerts or other outputs that indicate how agent 504 should provide additional services and assistance to customer 506.

For example, agent score 514 may only show a 6 out of 10 during call 502. This may be caused by the interruptions, such as customer request 510 where customer 506 requested that agent 504 provide another agent for assistance and/or reduce the amount that agent 504 is talking over customer 506 and/or interrupting. Agent score 514 may further display a breakdown of what agent 504 is doing, which may show components of an overall score and what agent 504 is doing well or poorly when interrupting and/or causing talk-over segments. Agent notifications 516 provide direct textual support or recommendations via notifications, which may also have a time during call 502 where the corresponding good or bad interruptions occur. Thus, selections and inputs may be made in user interface 500, which may be used to navigate to additional data and/or receive that data for use during and/or after call 502 for analysis.

Figure 6:
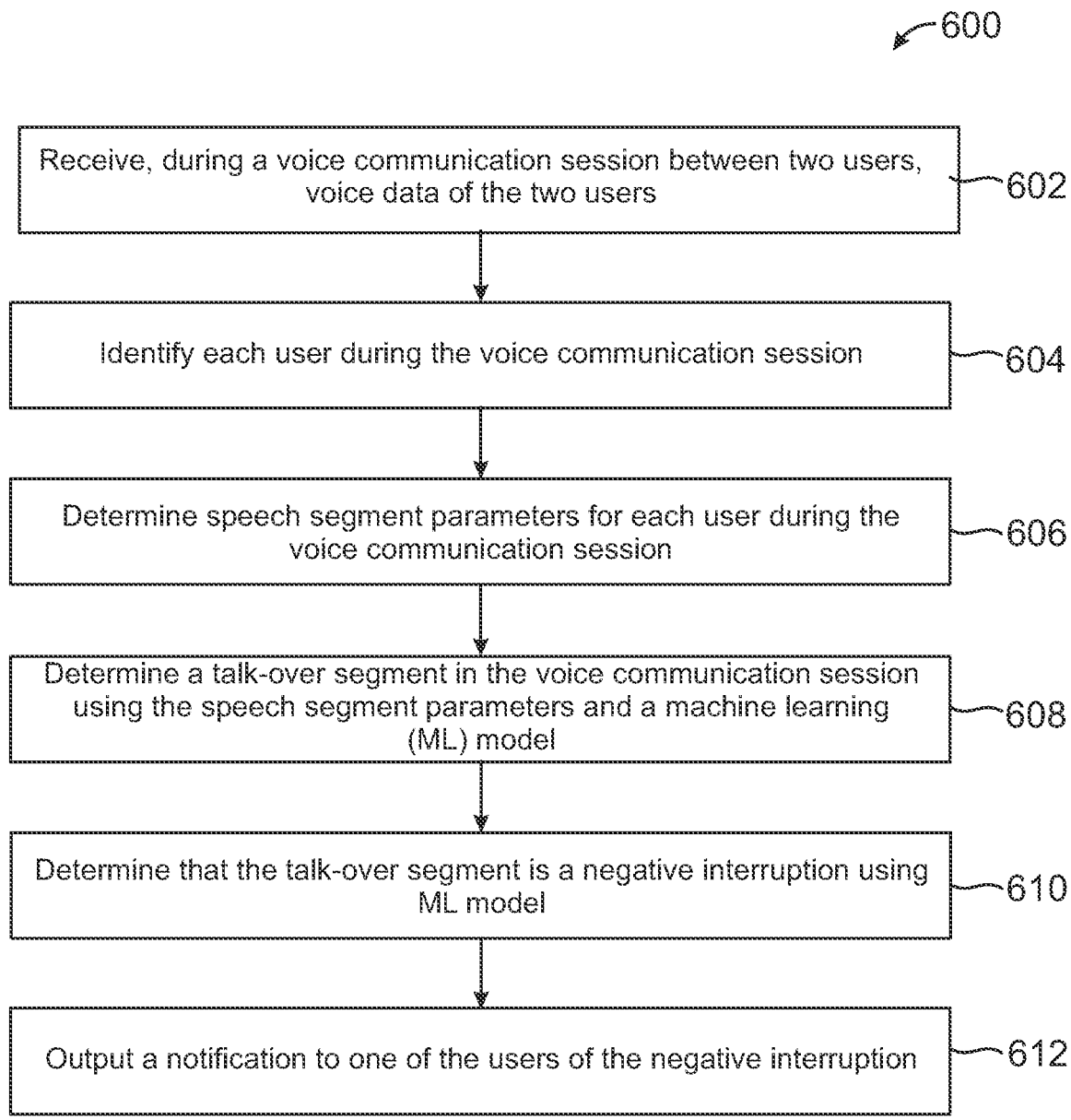
FIG. 6 is an exemplary flowchart for identifying and classifying talk-over segments during voice communications according to some embodiments.

FIG. 6 is an exemplary flowchart 600 for identifying and classifying talk-over segments during voice communications according to some embodiments. In some embodiments, generation and utilization of an AI model trained for interruption and talk-over segment analysis and categorization described in method 500 of FIG. 5 can be implemented and performed using an online service provider system, such as call processor server 130. One or more of the processes 602-612 of method 600 may be implemented, at least in part, in the form of executable code stored on non-transitory, tangible, machine-readable media that when run by one or more processors may cause the one or more processors to perform one or more of the processes 602-612. In some embodiments, method 600 can be performed by one or more computing devices in environment 100 of FIG. 1.

At step 602 of method 600, voice data of two users is received during a voice communication session between the two users. The voice data may correspond to one or more audio files, where different channels of audio are received from different speakers engaged in the voice communication session. For example, each channel may have voice data for each user, which may be analyzed together to identify any talk-over segments and classify or categorize those talk-over segments as good or bad interruptions. At step 604, each user is identified during the voice communication session. This may include assigning an identifier, name, or the like to each audio channel, which may allow for identification of each user. For example, an agent and a customer may be identified, which may be used to determine whether certain talk-over segments by the agent are bad interruptions and should be minimized to provide better customer service and assistance during the voice communications.

At step 606, speech segment parameters for each user are determined during the voice communication session. In this regard, VAD, SAD, and/or ASR may be used to identify portions of the voice data where voice from each user is identified, as well as a start and/or end time for the voice in each channel during each voice segment. In some embodiments, additional features and parameters may also be determined, such as words, sentences, and the like that occur during the speech. However, words may not be required, which may allow the system to be agnostic with regard to the corresponding language of the users. At step 608, a talk-over segment is determined during the voice communication session using the speech segment parameters and an ML model. A talk-over segment may be identified as speech occurring in each channel of the audio file and/or voice data, where speech may overlap and/or occur entirely at the same time. The talk-over segment is therefore a time or portion of the audio file which includes voice and/or speech activity that overlaps from each channel.

At step 610, it is determined that the talk-over segment is a negative interruption using the ML model. For example, where non-negative or positive interruption occur, no alert may be necessary as the interruption was beneficial to the conversation between the two users and/or does not lead to a negative customer interaction. Thus, not all classifications by the ML model may result in bad interruptions and alerts to users, and further categories and outputs may be associated with positive and/or neutral interruptions. However, with negative or bad interruptions, the agent may be notified of such interruptions to minimize those interruptions and/or provide better customer service. Thus, based on input features and/or parameters of the talk-over segment, the ML model may make a corresponding prediction or classification, which may be an output score, category, or the like. This may be based on trained layers of the ML model and may use a ML algorithm trained using training data and annotations of the training data. In some embodiments, the ML algorithm may correspond to random forest; however, other algorithms including boosting algorithms (e.g., XGBoost), decision trees, linear regression, and the like may also be used.

At step 612, a notification is output to one of the users of the negative interruption. A notification may correspond to an alert, which is displayed during the voice communications to an agent that may be causing the bad or negative interruptions. A user interface may be provided in order to display the notification, which may have information associated the customer's sentiment, time of the interruption and/or audio/text of the interruption, and/or one or more options to link to and/or play the interruption back for analysis. The notification may also be transmitted to a supervisor or other entity that may be able to review and/or assist the agent with providing customer service to users.

As discussed above and further emphasized here, FIGS. 1, 2, 3, 4, 5, and 6 are merely examples of call processor server 130 and corresponding methods for categorizing interruptions and/or talk-over segments for real-time alerts and notifications, which examples should not be used to unduly limit the scope of the claims. One of ordinary skill in the art would recognize many variations, alternatives, and modifications.

Figure 7:
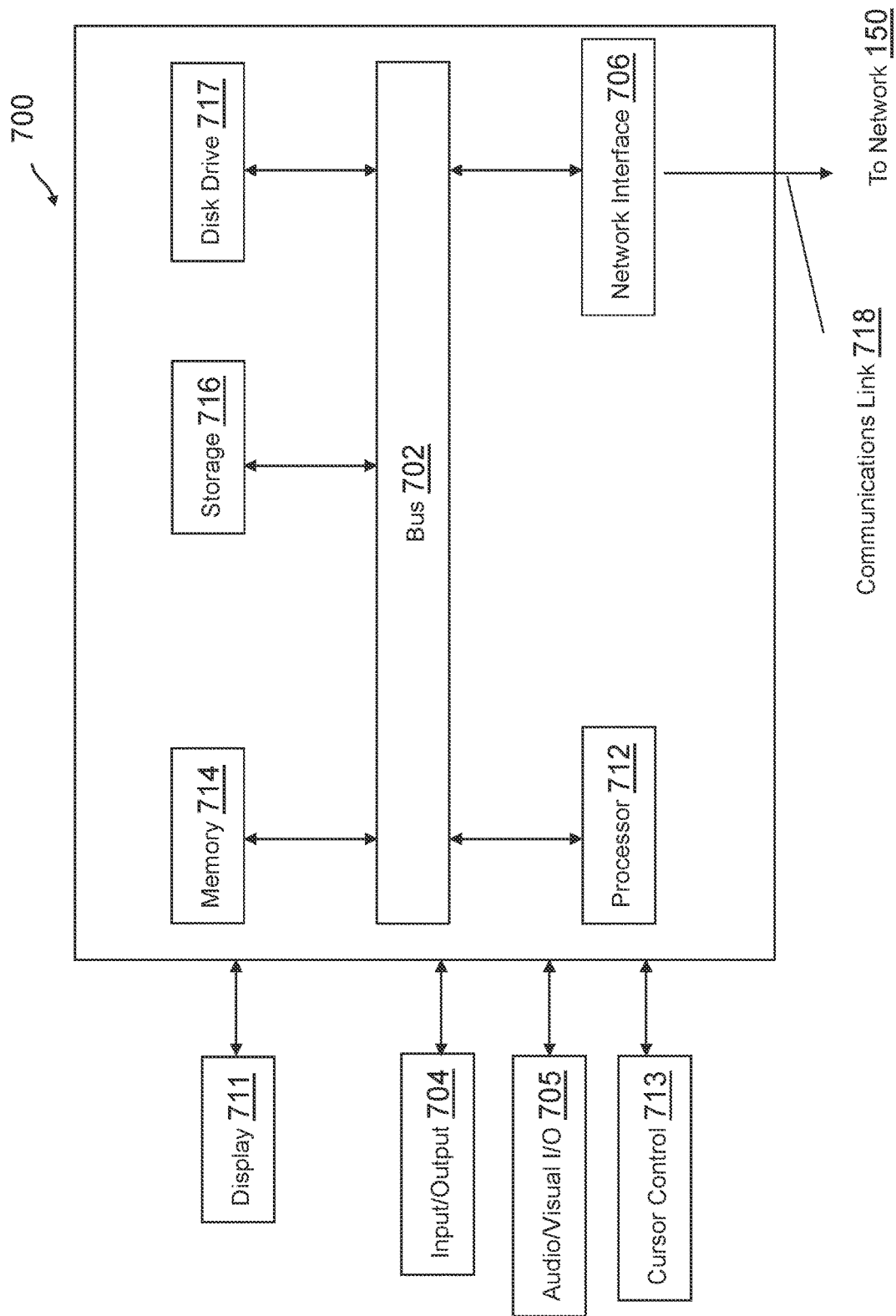
FIG. 7 is a simplified diagram of a computing device according to some embodiments.

FIG. 7 is a block diagram of a computer system suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 700 in a manner as follows.

Computer system 700 includes a bus 702 or other communication mechanism for communicating information data, signals, and information between various components of computer system 700. Components include an input/output (I/O) component 704 that processes a user action, such as selecting keys from a keypad/keyboard, selecting one or more buttons, image, or links, and/or moving one or more images, etc., and sends a corresponding signal to bus 702. I/O component 704 may also include an output component, such as a display 711 and a cursor control 713 (such as a keyboard, keypad, mouse, etc.). An optional audio/visual input/output component 705 may also be included to allow a user to use voice for inputting information by converting audio signals. Audio/visual I/O component 705 may allow the user to hear audio, and well as input and/or output video. A transceiver or network interface 706 transmits and receives signals between computer system 700 and other devices, such as another communication device, service device, or a service provider server via network 140. In one embodiment, the transmission is wireless, although other transmission mediums and methods may also be suitable. One or more processors 712, which can be a micro-controller, digital signal processor (DSP), or other processing component, processes these various signals, such as for display on computer system 700 or transmission to other devices via a communication link 718. Processor(s) 712 may also control transmission of information, such as cookies or IP addresses, to other devices.

Components of computer system 700 also include a system memory component 714 (e.g., RAM), a static storage component 716 (e.g., ROM), and/or a disk drive 717. Computer system 700 performs specific operations by processor(s) 712 and other components by executing one or more sequences of instructions contained in system memory component 714. Logic may be encoded in a computer readable medium, which may refer to any medium that participates in providing instructions to processor(s) 712 for execution. Such a medium may take many forms, including but not limited to, non-volatile media, volatile media, and transmission media. In various embodiments, non-volatile media includes optical or magnetic disks, volatile media includes dynamic memory, such as system memory component 714, and transmission media includes coaxial cables, copper wire, and fiber optics, including wires that comprise bus 702. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 700. In various other embodiments of the present disclosure, a plurality of computer systems 700 coupled by communication link 718 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

Although illustrative embodiments have been shown and described, a wide range of modifications, changes and substitutions are contemplated in the foregoing disclosure and in some instances, some features of the embodiments may be employed without a corresponding use of other features. One of ordinary skill in the art would recognize many variations, alternatives, and modifications of the foregoing disclosure. Thus, the scope of the present application should be limited only by the following claims, and it is appropriate that the claims be construed broadly and in a manner consistent with the scope of the embodiments disclosed herein.

What is claimed is:

1. A voice analysis system configured to analyze audio signals from an incoming voice call, the voice analysis system comprising:
a processor and a computer readable medium operably coupled thereto, the computer readable medium comprising a plurality of instructions stored in association therewith that are accessible to, and executable by, the processor, to perform voice analysis operations which comprise:
receiving a first audio signal comprising a first audio waveform of a first speech between at least two users during the incoming voice call;
accessing speech segment parameters for analyzing the audio signals, wherein the speech segment parameters are used by the voice analysis system to identify one or more talk-over segments within the first audio waveform based on individual audio waveforms from the at least two users in the first audio waveform;
determining the one or more talk-over segments in the first audio waveform using the speech segment parameters, wherein the one or more talk-over segments comprise one or more intersections between the individual audio waveforms from the at least two users in the first audio waveform;
extracting audio features from each of the one or more talk-over segments;
determining, using a machine learning (ML) model trained for interruption analysis of the audio signals, whether each of the one or more talk-over segments are a negative interruption or a non-negative interruption based on the audio features; and
determining whether to output a first notification based on whether each of the one or more talk-over segments are the negative interruption or the non-negative interruption.

2. The voice analysis system of claim 1, wherein determining whether to output the first notification comprises:
outputting, in response to determining that one of the one or more talk-over segments is the negative interruption, the first notification to an agent of the at least two users that the one of the one or more talk-over segments is the negative interruption during the incoming voice call.

3. The voice analysis system of claim 2, wherein the voice analysis operations further comprise:
providing a user interface to the agent during the incoming voice call, wherein the first notification, in the user interface, identifies at least one time during the incoming voice call where the one or more talk-over segments occurs and an option to minimize further negative talk-over segments during the incoming voice call.

4. The voice analysis system of claim 1, wherein the first audio signal comprises a stereo voice conversation input between the at least two users from at least two devices.

5. The voice analysis system of claim 1, wherein the ML model is trained using one of a linear regression algorithm, a random forest algorithm, a gradient boosting algorithm, or a binary classification ML algorithm, and wherein the ML model is configured to be executed in a real-time production computing environment associated with the incoming voice call or in an offline computing environment that provides analytics for agent review for an agent for the at least two users.

6. The voice analysis system of claim 1, wherein, before receiving the first audio signal, the voice analysis operations further comprise:
training the ML model for the interruption analysis using training data comprising past audio signals and at least one of past identified non-negative interruptions or past identified negative interruptions in the past audio signals, wherein training the ML model enables the ML model to provide one or more predictive output scores that identify whether the one or more intersections of the audio signals comprise the non-negative interruption or the negative interruption.

7. The voice analysis system of claim 1, wherein the voice analysis operations further comprise:
receiving a second audio signal at a time after the first audio signal, wherein the second audio signal comprises a second audio waveform of a second speech between the at least two users during the incoming voice call; and
determining whether to output a second notification based on the second audio signal and one or more responses to the first notification.

8. The voice analysis system of claim 1, wherein the speech segment parameters are associated with at least one of a voice activity detector (VAD) or a speech activity detector (SAD) configured to detect a presence or an absence of speech in the first speech.

9. A method to analyze audio signals from an incoming voice call to categorize talk-over segments, which method comprises:
receiving a first audio signal comprising a first audio waveform of a first speech between at least two users during the incoming voice call;
accessing speech segment parameters for analyzing the audio signals, wherein the speech segment parameters are used by the voice analysis system to identify one or more talk-over segments within the first audio waveform based on individual audio waveforms from the at least two users in the first audio waveform;

determining the one or more talk-over segments in the first audio waveform using the speech segment parameters, wherein the one or more talk-over segments comprise one or more intersections between the individual audio waveforms from the at least two users in the first audio waveform;

extracting audio features from each of the one or more talk-over segments;

determining, using a machine learning (ML) model trained for interruption analysis of the audio signals, whether each of the one or more talk-over segments are a negative interruption or a non-negative interruption based on the audio features; and determining whether to output a first notification based on whether each of the one or more talk-over segments are the negative interruption or the non-negative interruption.

10. The method of claim 9, wherein determining whether to output the first notification comprises:

outputting, in response to determining that one of the one or more talk-over segments is the negative interruption, the first notification to an agent of the at least two users that the one of the one or more talk-over segments is the negative interruption during the incoming voice call.

11. The method of claim 10, which further comprises:
providing a user interface to the agent during the incoming voice call, wherein the first notification, in the user interface, identifies at least one time during the incoming voice call where the one or more talk-over segments occurs and an option to minimize further negative talk-over segments during the incoming voice call.

12. The method of claim 9, wherein the first audio signal comprises a stereo voice conversation input between the at least two users from at least two devices.

13. The method of claim 9, wherein the ML model is trained using one of a linear regression algorithm, a random forest algorithm, a gradient boosting algorithm, or a binary classification ML algorithm, and wherein the ML model is configured to be executed in a real-time production computing environment associated with the incoming voice call or in an offline computing environment that provides analytics for agent review for an agent for the at least two users.

14. The method of claim 9, wherein, before receiving the first audio signal, the method further comprises:

training the ML model for the interruption analysis using training data comprising past audio signals and at least one of past identified negative interruptions or past identified non-negative interruptions in the past audio signals, wherein training the ML model enables the ML model to provide one or more predictive output scores that identify whether the one or more intersections of the audio signals comprise the negative interruption or the non-negative interruption.

15. The method of claim 9, which further comprises:
receiving a second audio signal at a time after the first audio signal, wherein the second audio signal comprises a second audio waveform of a second speech between the at least two users during the incoming voice call; and determining whether to output a second notification based on the second audio signal and one or more responses to the first notification.

16. The method of claim 9, wherein the speech segment parameters are associated with at least one of a voice activity detector (VAD) or a speech activity detector (SAD) configured to detect a presence or an absence of speech in the first speech.

17. A non-transitory computer-readable medium having stored thereon computer-readable instructions executable to analyze audio signals from an incoming voice call for a voice analysis system, the computer-readable instructions executable to perform voice analysis operations which comprise:

receiving a first audio signal comprising a first audio waveform of a first speech between at least two users during the incoming voice call;

accessing speech segment parameters for analyzing the audio signals, wherein the speech segment parameters are used by the voice analysis system to identify one or more talk-over segments within the first audio waveform based on individual audio waveforms from the at least two users in the first audio waveform;

determining the one or more talk-over segments in the first audio waveform using the speech segment parameters, wherein the one or more talk-over segments comprise one or more intersections between the individual audio waveforms from the at least two users in the first audio waveform;

extracting audio features from each of the one or more talk-over segments;

determining, using a machine learning (ML) model trained for interruption analysis of the audio signals, whether each of the one or more talk-over segments are a negative interruption or a non-negative interruption based on the audio features; and determining whether to output a first notification based on whether each of the one or more talk-over segments are the negative interruption or the non-negative interruption.

18. The non-transitory computer-readable medium of claim 17, wherein determining whether to output the first notification comprises:

outputting, in response to determining that one of the one or more talk-over segments is the negative interruption, the first notification to an agent of the at least two users that the one of the one or more talk-over segments is the negative interruption during the incoming voice call.

19. The non-transitory computer-readable medium of claim 18, wherein the voice analysis operations further comprise:

providing a user interface to the agent during the incoming voice call, wherein the first notification, in the user interface, identifies at least one time during the incoming voice call where the one or more talk-over segments occurs and an option to minimize further negative talk-over segments during the incoming voice call.

20. The non-transitory computer-readable medium of claim 17, wherein the first audio signal comprises a stereo voice conversation input between the at least two users from at least two devices.

* * * * *